(12) United States Patent
Fodil et al.

(10) Patent No.: US 7,974,206 B2
(45) Date of Patent: Jul. 5, 2011

(54) METHOD FOR ESTABLISHING A SECURED CONNECTION, CORRESPONDING SFC APPARATUS, MFC APPARATUS, REQUESTING TERMINAL AND COMPUTER PROGRAM PRODUCT

(75) Inventors: Idir Fodil, Lannion (FR); Mickael Allain, Louannec (FR)

(73) Assignee: France Telecom, Paris (FR)

( * ) Notice: Subject to any disclaimer, the term of this patent is extended or adjusted under 35 U.S.C. 154(b) by 130 days.

(21) Appl. No.: 12/514,262

(22) PCT Filed: Oct. 26, 2007

(86) PCT No.: PCT/FR2007/052255
§ 371 (c)(1),
(2), (4) Date: May 8, 2009

(87) PCT Pub. No.: WO2008/056071
PCT Pub. Date: May 15, 2008

(65) Prior Publication Data
US 2010/0027422 A1    Feb. 4, 2010

(30) Foreign Application Priority Data
Nov. 8, 2006 (FR) ...................................... 06 09772

(51) Int. Cl.
*H04J 1/16* (2006.01)
(52) U.S. Cl. ............................ 370/235; 370/392; 726/14
(58) Field of Classification Search .................. 370/235, 370/392; 726/14
See application file for complete search history.

(56) References Cited

U.S. PATENT DOCUMENTS

| | | | | |
|---|---|---|---|---|
| 2007/0243891 A1* | 10/2007 | Civanlar et al. | ............... | 455/466 |
| 2007/0248077 A1* | 10/2007 | Mahle et al. | .................. | 370/352 |
| 2007/0253417 A1* | 11/2007 | Purnadi et al. | ................ | 370/392 |
| 2008/0056243 A1* | 3/2008 | Roy et al. | ...................... | 370/352 |
| 2008/0098228 A1* | 4/2008 | Anderson et al. | ............. | 713/172 |
| 2008/0216541 A1* | 9/2008 | Fudulu et al. | .................. | 72/181 |
| 2008/0270618 A1* | 10/2008 | Rosenberg | ..................... | 709/228 |
| 2009/0279506 A1* | 11/2009 | Sinnreich et al. | ............. | 370/331 |
| 2010/0049856 A1* | 2/2010 | Wright et al. | ................. | 709/227 |

OTHER PUBLICATIONS

Sanjoy Sen Patrick Sollee Sean March Nortel Networks: Midcom-unaware NAT/Firewall Traversal, IETF Standard-Working Draft—Internet Engineering Task Force-IEFT, Ch, No. 1, Apr. 2002.
Rosenberg J et al: SIP Traversal through Residential and Enterprise NATs and Firewalls, Internet Citation, Mar. 2, 2001.
French Search Report for French Application No. FR06/09772, filed Nov. 8, 2006.
English Translation of the Written Opinion of Counterpart Application No. PCT/FR2007/052255 filed on Oct. 26, 2007.
International Search Report dated Apr. 22, 2008 for corresponding International Application No. PCT/FR2007/052255, filed Oct. 26, 2007.

* cited by examiner

*Primary Examiner* — Andrew Lee
(74) *Attorney, Agent, or Firm* — David D. Brush; Westman, Champlin & Kelly P.A.

(57) ABSTRACT

A method is provided for establishing a secured connection and to corresponding SFC equipment, CFM equipment, and terminal requiring a computer software program. More specifically, a method is provided for transmitting a multimedia flow from or to a terminal, that includes: a step of establishing a signalling between the terminal and a signalling flow control equipment; and a step of implementing, between the terminal and a multimedia flow control equipment, a mechanism for crossing an address translation equipment. The method further includes a step of checking that the terminal requiring execution of the implementation step, is the same terminal as the one involved in execution of the signalling establishment step.

8 Claims, 4 Drawing Sheets

METHOD FOR ESTABLISHING A SECURED CONNECTION, CORRESPONDING SFC APPARATUS, MFC APPARATUS, REQUESTING TERMINAL AND COMPUTER PROGRAM PRODUCT

CROSS-REFERENCE TO RELATED APPLICATIONS

This Application is a Section 371 National Stage Application of International Application No. PCT/FR2007/052255, filed Oct. 26, 2007 and published as WO2008/056071 on May 15, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of communications, especially multimedia contents, on networks compatible especially compatible with the IP protocol offering multimedia services such as voice-on-IP, video etc to users.

Preferably, the disclosure pertains to a network implementing the HNT (Hosted NAT Traversal) procedure between a network apparatus for controlling multimedia flows and at least one user terminal when the network comprises at least one apparatus carrying out network address and/or port translation here below designated as a NAT ("Network Address Translation") apparatus.

Indeed, the HNT procedure (described here below) which is a mechanism for the traversal of NAT type address translation apparatuses is generally implemented when a given terminal connected upstream to a NAT apparatus (for example a home gateway) wishes to send a multimedia content through this NAT apparatus. A use of the HNT procedure is described in the document ES 283003 proposed by the ETSI ("European Telecommunication Standards Institute").

BACKGROUND OF THE DISCLOSURE

In a multimedia network compatible with the IP protocol, in the context of the setting up of a multimedia connection (during which for example multimedia contents are exchanged) between a given terminal and a destination apparatus, the given terminal first of all exchanges signaling messages, for example messages compatible with the "Session Initiation Protocol" referenced here below as the SIP protocol (or with any other signaling protocol) with a signaling flow control apparatus (here below designated as an SFC (signaling flow control) apparatus. These exchanges are a step of signaling between the terminal and the signaling flow control apparatus.

Thus, this SFC apparatus is an apparatus that enables the setting up of signaling between a given terminal and an operator's network. AN SFC apparatus embeds for example the P-CSCF (Proxy Call Session Control Function) defined according to the 3GPP IMS (Third Generation Partnership Project, IP Multimedia Subsystem) described in the document referenced 3GPP TS 23.228 and the ETSI TISPAN (European Telecommunication Standards Institute Telecommunications and Internet converged Services and Protocols for Advanced Networks) standard described in the document referenced ETSI ES 282007.

During the processing of these signaling messages, the SFC apparatus communicates with a multimedia flow control here below called MFC (Multimedia Flow Control) apparatus to reserve the necessary resources and authorize the flows of multimedia contents between the given terminal and the destination apparatus.

Thus, this MFC apparatus is an apparatus used to control multimedia flows from the terminals. An example of an MFC apparatus is the C-BGF (Cone Border Gateway Function) presented in the ETSI TISPAN standard.

Should there be no NAT apparatus connected to the multimedia contents transmission path between the given terminal and the MFC apparatus as well as the given terminal and SFC apparatus, it is not necessary to implement the HNT procedure because the MFC apparatus has access to the IP/Port addresses used by the given terminal for the reception of contents and the given terminal has access to the IP/Port addresses allocated for the MFC apparatus for sending contents.

FIG. 1 illustrates the kept table of correspondence 100 of IP/Port addresses at the level of the MFC apparatus 110 for the given terminal should there be no NAT apparatus connected to the multimedia contents transmission path between the terminal 120 and the MFC apparatus 110 as well as between the terminal 120 and the SFC apparatus in the case of compatible communications with the RTP and RTCP (Real-time Transfer Protocol and Real-time Transfer Control Protocol) described in the RFC 1889 standard.

The correspondence table 100 comprises the addresses Src IP-Port 1 and Src IP-Port 2 of the sending ports of the terminal 120, the addresses Dst IP-Port of the reception ports of the destination apparatus (not shown), the addresses Src IP-Port of the sending ports of the destination apparatus and the address Dst IP-Port 3 and Dst IP-Port 4 of the reception ports of the given terminal.

When multimedia flows are sent or received by the terminal 120, the MFC apparatus 110 replaces the IP/Port addresses marked as being unknown 101 on the figure by the IP/port addresses used respectively by the terminal 120 for sending multimedia flows and by the destination apparatus for sending multimedia flows to the terminal 120.

Given that only the given terminal 120 knows the IP/Port address allocated by the MFC apparatus to sending multimedia flows (because this IP/Port address has been preliminarily transmitted to it by the SFC apparatus), there is no risk that another "identity-thief" or "usurper" terminal might take the place of the given terminal which has initiated the connection.

However, when a NAT apparatus is connected between the given terminal and the MFC apparatus as well between the given terminal and the SFC apparatus, there is a risk that an identity-thief terminal will pass itself off as the given terminal that has initiated the connection in order to use its session and deprive the given terminal of the use of the session that it has initiated.

Referring to FIG. 2, an illustration is provided of the correspondence table 200 kept at the level of the MFC apparatus 110 when a NAT apparatus 230 is connected to the multimedia contents transmission path between the given terminal 120 and the MFC apparatus 110 as well as between the given terminal 120 and the SFC apparatus in the case of communications compatible with the RTP/RTCP protocol.

As illustrated in FIG. 2, the MFC apparatus 110 does not know the IP/Port address to which it must redirect the flows sent to the given terminal 120. Nor does it know the address that will be used by the NAT apparatus 230 for sending the flows of the given terminal 120.

In order to resolve these problems, the invention uses the HNT procedure to enable the MFC apparatus 110 to allow the media flows to travel in transit from or to the given terminal 120.

Thus, when the multimedia connection is set up, the SFC apparatus which is not shown in FIG. 2 detects the fact that the given terminal 120 is connected to it through a NAT apparatus 230 because the IP addresses for the media flows specified by the given terminal 120 in the signaling protocol are different from the source IP address of the packet conveying the signaling and received by the SFC apparatus. This apparatus will then:

activate the HNT procedure;
inform the MFC apparatus that for this media connection requested by the given terminal, the IP/Port addresses of the given terminal are unknown;
request the MFC apparatus to execute the HNT procedure.

The MFC apparatus that has reserved the IP/Port addresses for the media connection waits for the given terminal to send it one or more empty packets (IP packets encapsulating empty media packets) in order to know:

the IP/Port address allocated by the NAT apparatus for the transmission of the media flows sent by the given terminal;
the IP/Port address allocated by the NAT apparatus for the transmission of the media flows to the given terminal.

Through the empty packets received and for the given terminal and the given connection, the MFC apparatus replaces the unknown fields kept in its table of correspondence by the information (IP/Port address) which it now knows.

The drawback of this prior art technique is the lack of security related to the use of the HNT procedure.

Once the signaling has been set up between the given terminal wishing to initiate a connection and the SFC apparatus, and once the correspondence tables have been set up by the MFC apparatus, a usurper or identity-thief terminal other then the given terminal which has initiated the connection can pass itself off as the given terminal and thus use its connection. This can happen if the identity-thief terminal should initiate the HNT procedure before the given terminal does so.

FIG. 3 illustrates the way in which an identity-thief terminal 340 can pass itself off as the given terminal 120 and use the connection that this terminal has initiated.

In a step reference 301, the given terminal 120 initiates a multimedia connection with SFC apparatus 350 and then the SFC apparatus 350 informs the MFC apparatus 110 that a connection has been initiated.

In a step reference 302, the identity-thief terminal 340 starts the HNT procedure with the MFC apparatus 110 and thus uses the connection set up by the given terminal 120. Then, in a step reference 303, the MFC apparatus 110 authorizes the setting up of the flows between the identity-thief terminal 340 and the destination apparatus not shown in FIG. 3.

Then, in a step referenced 304, the given terminal 120 in turn initiates the HNT procedure with the MFC apparatus 110. The MFC apparatus 110 does not permit the setting up of the flows between the given terminal 120 and the destination apparatus because it has already converted the rules illustrated in FIG. 2 on the basis of the IP/Port addresses given by the identity-thief terminal 340.

Thus, this mechanism can be likened to a denial of service because it prevents the given terminal 120 from transmitting and/or receiving a multimedia content as well as to a theft of service because the flows are invoiced to the initiator of the request, hence to the terminal 120.

There is therefore need for a technique to overcome these drawbacks of the prior art.

At present, there is no technique for securing the HNT procedure.

The inventors have observed that in certain situations it would be desirable, in the case of a given terminal which has initiated the multimedia connection with an MFC apparatus, to reserve the use of this connection for this terminal in order that it may transmit and/or receive multimedia flows.

This is especially the case when an identity-thief terminal other than the given terminal tries to use the connection set up by the given terminal with an MFC apparatus in order to transmit and/or receive the multimedia flows whereas it is not authorized to do so.

SUMMARY

An aspect of the disclosure relates to a method for transmitting a multimedia flow from or to a terminal, comprising:

a step of setting up signaling between the terminal and a signaling flow control (SFC) apparatus, and
a step of implementing, between a terminal and a multimedia flow control (MFC) apparatus, an HNT mechanism for traversal of a network translation apparatus (NAT).

According to an embodiment of the invention, the method for transmitting further comprises a step of checking that said terminal requesting the execution of said step of implementing is the same as said terminal involved in the execution of said step of setting up signaling.

The general principle of an embodiment of the invention therefore relies on a securing of the network address translation traversal mechanism through a check on whether the requesting terminal and the terminal that has set up the signaling are identical.

Thus, an embodiment of the invention enables the reservation, for the terminal which has set up a signaling operation with a multimedia flow control apparatus for transmitting a flow through an address translation apparatus, of the use of this signaling in order to transmit and/or receive the multimedia flow.

Thus, an embodiment of the invention makes it possible to ensure that an identity-thief terminal cannot take advantage of an establishment of a signaling operation preliminarily implemented by another terminal.

According to one characteristic of an embodiment of the invention, said step of checking comprises a step of combining a first piece of authorization information coming from the requesting terminal and a second piece of authorization information coming from the signaling flow control apparatus and a step of authorizing said transmission after checking that the first and second pieces of information are matched.

For example, the first and second pieces of authorization information are matched if they are identical. If the first and second pieces of authorization information are not matched, the transmission of multimedia flows from or to the requesting terminal is not authorized.

According to one characteristic of an embodiment of the invention, the first piece and the second piece of authorization information respectively are preliminarily transmitted to the terminal and to the multimedia flow control apparatus respectively by the signaling flow control apparatus.

Thus, it is the signaling flow control apparatus that generates information elements of authorization during the phase of initializing the session launched by the terminal and transmits them firstly to the terminal and secondly to the multimedia flow control apparatus. It can thus generate two pieces of authorization information that are identical or can be deduced from one another by mathematical transformation for example.

According to one characteristic of an embodiment of the invention, the second piece of authorization information is included in at least one field of a requesting for reserving resources for transmission of the flow.

Thus, an embodiment of the invention does not dictate the addition to the multimedia flow transmission method of the implementation of a message dedicated to the transmission of the second piece of authorization information.

On the contrary, the message dedicated to the resource reservation transmitted by the signaling flow control apparatus to the multimedia flow control apparatus is also used to make this transmission of the second piece of information.

According to one variant compliant with an embodiment of the present invention, the second piece of authorization information is encapsulated in a message of resource reservation.

According to one characteristic of an embodiment of the present invention, the transmission of the second piece of authorization information is done by means of a direct interface between the signaling flow control apparatus and the multimedia flow control apparatus.

According to one characteristic of an embodiment of the invention, the first piece of authorization information is included in at least one field of a message confirming acceptance of the setting up of a connection between the signaling flow control apparatus and the requesting terminal.

Thus, an embodiment of the invention does not impose the adding, to the multimedia flow transmission method, of the implementing of a message dedicated to the transmission of the first piece of authorization information.

According to one variant compliant with an embodiment of the invention, the first piece of authorization information is encapsulated in a signaling message.

According to one characteristic of an embodiment of the invention, the first and second pieces of authorization information are unique for each flow transmitted from or to the terminal.

This augments the securing of the traversal mechanism of the address translation apparatus through the independent securing of each of the flows.

According to one characteristic of an embodiment of the invention, said step of combining the first and second pieces of authorization information is implemented by the multimedia flow control apparatus after it has received said first and second pieces of authorization information.

In particular, the first piece of authorization information is transmitted by the terminal to the multimedia flow control apparatus when this terminal wishes to initiate the step for implementing the HNT mechanism of traversal of a network address translation apparatus.

According to one characteristic of an embodiment of the invention, if the first and second pieces of information are not matched, the multimedia flow control apparatus can send a message to the signaling flow control apparatus informing it that a fraudulent attempt to set up a connection has been implemented by the requesting terminal.

For example, the address translation apparatus traversal mechanism is the HNT procedure which is used to update a list of at least one multimedia flow control apparatus address and said updating is done only if the first and second pieces of authorization information are matched.

An embodiment of the invention also concerns a computer program product downloadable from a communications network and/or recorded on a computer-readable carrier and/or executable by a processor, characterized in that it comprises program code instructions for implementing the method for transmitting as described here above.

An embodiment of the invention also pertains to a multimedia flow control (MFC) apparatus comprising means for the implementing, with a terminal, of an HNT mechanism for traversal of a network translation apparatus (NAT) in the context of the transmission of a multimedia flow from or to the terminal.

According to an embodiment of the invention, the multimedia flow control apparatus further comprises means for checking that said terminal requesting the activation of said means for implementing is the same as a second terminal involved in the activation of means for setting up signaling between the second terminal and a signaling flow control (SFC) apparatus.

An embodiment of the invention also pertains to a signaling flow control apparatus comprising means for setting up signaling with a terminal in the context of the transmission of a multimedia flow from or to the terminal.

According to an embodiment of the invention, the signaling flow control apparatus comprises:
  means for transmitting a first piece of authorization information to the terminal;
  means for transmitting a second piece of authorization information to a multimedia flow control apparatus,
  and the first piece of authorization information is designed to be combined with the second piece of authorization information so as to authorize said transmission of the multimedia flow only after checking that the first and second pieces of information are matched.

An embodiment of the invention also concerns a terminal comprising:
  means for setting up signaling with a signaling flow control (SFC) apparatus in the context of the transmission of a given multimedia flow from or to the terminal;
  means for implementing, between a terminal and a multimedia flow control (MFC) apparatus, an (HNT) mechanism for traversal of a network translation apparatus (NAT).

According to an embodiment of the invention, the terminal further comprises means for receiving a first piece of authorization information is designed to be combined with a second piece of authorization information so as to authorize said transmission of the multimedia flow only after checking that the first and second pieces of information are matched.

The advantages of the above-mentioned computer program product, multimedia flow control apparatus, signaling flow control apparatus and terminal are similar to those of the transmission method described here above and shall not be described in more ample detail.

BRIEF DESCRIPTION OF THE DRAWINGS

Other features and advantages of embodiments of the invention shall appear from the following description, given by way of an indicative and non-exhaustive example and from the appended drawings, of which.

DETAILED DESCRIPTION OF ILLUSTRATIVE EMBODIMENTS

The general principle of an embodiment of the invention relies on the authentication of data packets sent by a terminal to a multimedia flow control apparatus, also called an MFC, in the context of the implementation of an HNT type procedure. This authentication relies on the comparison between a first piece of authorization information also called a "token" transmitted by the terminal to the MFC apparatus and a second piece of authorization information transmitted to the MFC apparatus for a signaling flow control apparatus, also called SFC, with which the terminal initiated its session.

Figure 1:
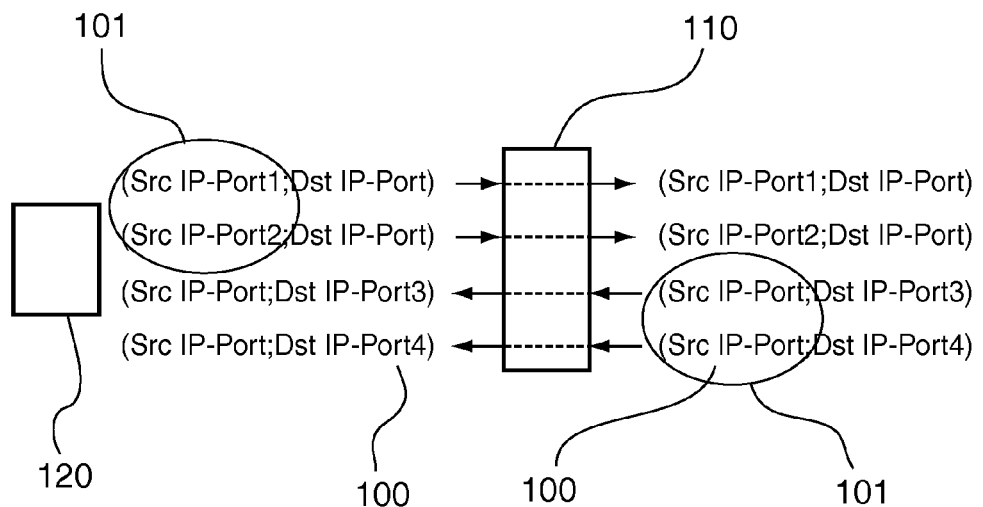
FIG. 1, already commented upon with reference to the prior art, illustrates a kept table of correspondences of IP/Port addresses in an MFC apparatus when no NAT apparatus is connected to the multimedia content transmission path between a given terminal and the MFC apparatus.
Figure 2:
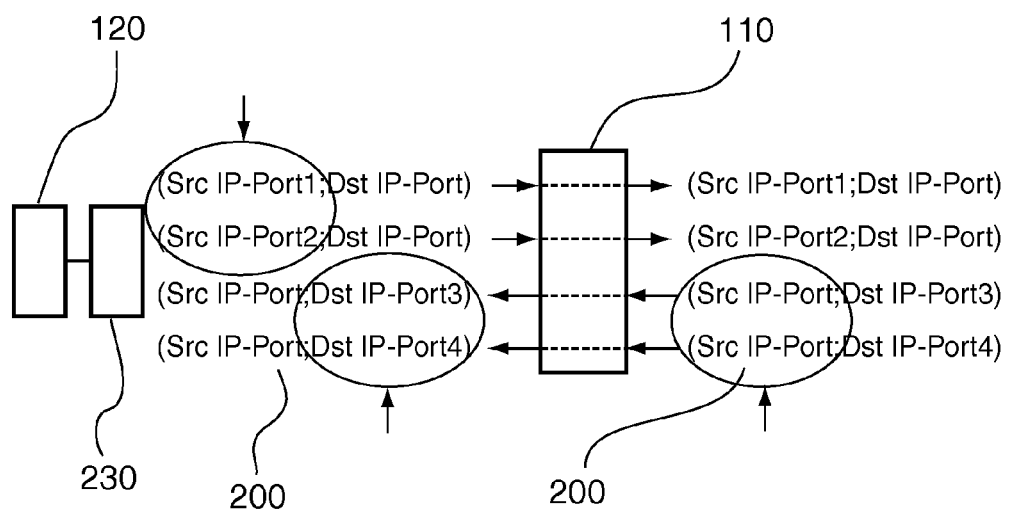
FIG. 2 already commented upon with reference to the prior art, illustrates the kept correspondence table in the MFC apparatus when a NAT apparatus is connected to the multimedia content transmission path between the given terminal and the MFC apparatus.
Figure 3:
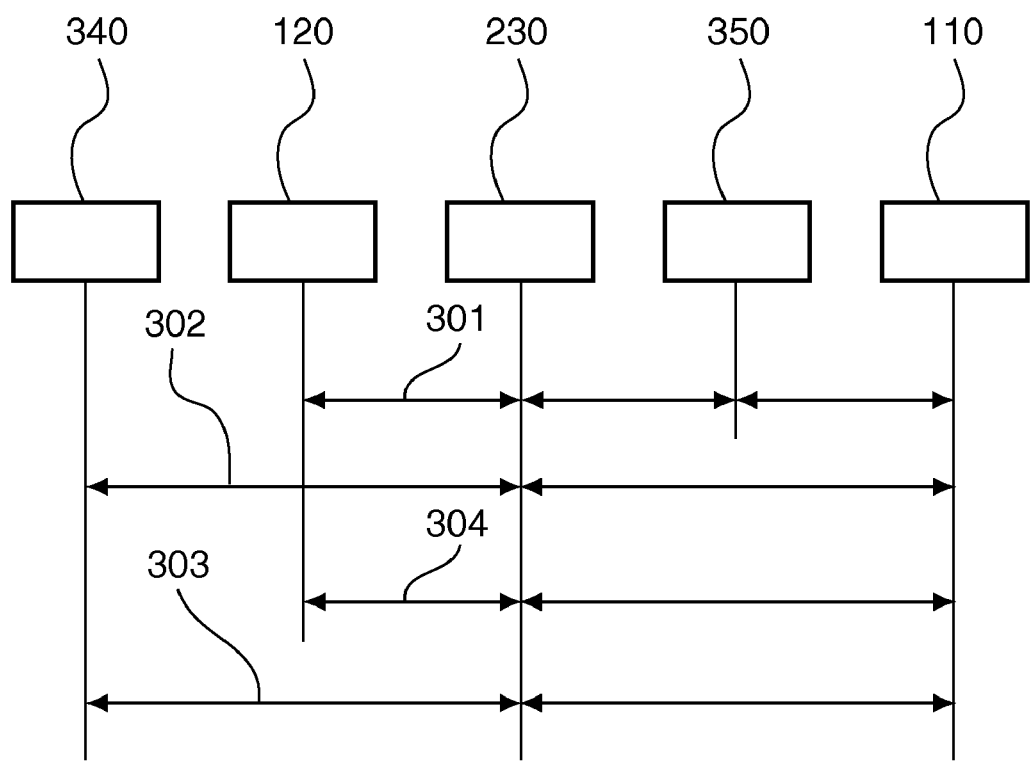
FIG. 3 already commented upon with reference to the prior art, illustrates the way in which an identity-thief terminal can pass itself off as a given terminal and use the connection that this given terminal has initiated.
Figure 4:
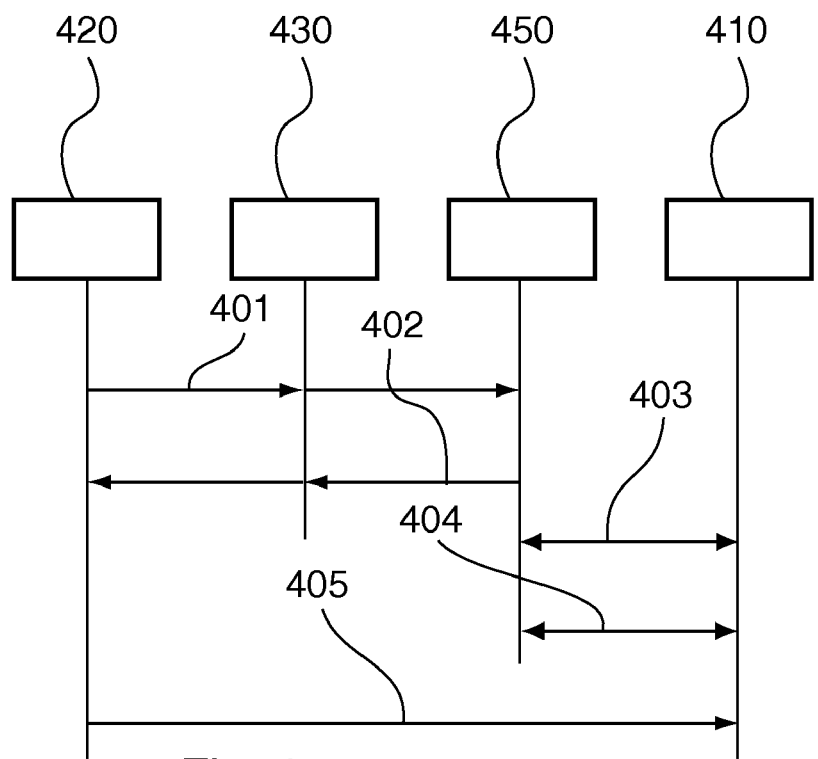
FIGS. 4 and 5 illustrate a particular embodiment of the method for setting up a main connection according to the invention.
Figure 5:
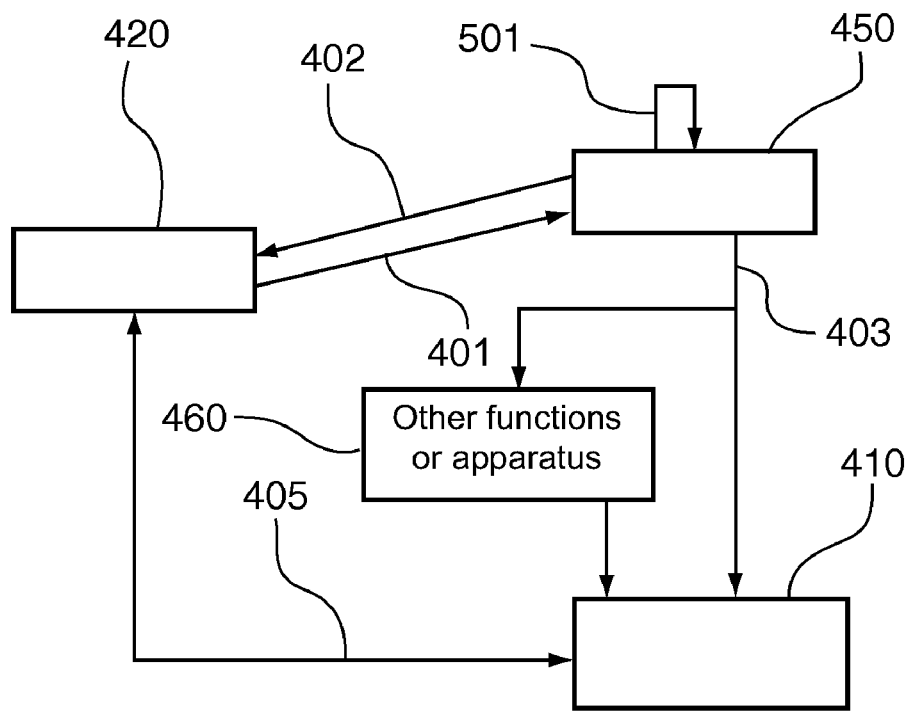

The description is situated in the context of a particular embodiment of the method of transmission of a multimedia flow according to an embodiment of the invention, illustrated by FIGS. 4 and 5.

According to this particular embodiment, a given terminal 420 of a multimedia communications network compatible with the IP protocol wishes to set up a main multimedia connection with a destination apparatus (not shown) in order to exchange at least one multimedia data flow c0 (not shown). The given terminal 420 and the destination apparatus are connected through a signaling flow control apparatus 450 (or SFC apparatus) compliant with a signaling protocol (which is for example the SIP protocol) and a multimedia flow control apparatus 410 (or MFC apparatus).

A NAT apparatus 430, for example a home gateway, is connected between the given terminal 420 and the SFC apparatus 450.

In a step referenced 400 for setting up signaling between the given terminal 420 and the SFC apparatus 450, the given terminal 420 sends the SFC apparatus 450 an initiation request (for example in the form a message compatible with the SIP protocol) for initiating a secondary connection between the SFC apparatus and a given terminal. Then, the SFC apparatus 450 receives this request coming from the given terminal 420.

If the SFC apparatus 450 agrees to implement the setting up of the secondary connection, then the following steps are implemented.

In a step 501, the SFC apparatus 450 generates a token (or piece of authorization information) which is for example a string of characters. The token generated by the SFC apparatus is unique for each multimedia flow.

Then, in a step 402, the SFC apparatus 450 sends the given terminal 420 a message to confirm acceptance of the setting up of the secondary connection (for example in the form of a message compatible with the SIP protocol).

The SFC apparatus 450 also transmits the token to the given terminal 420.

To this end, preferably, the token is included in at least one field of the message confirming acceptance of the setting up of the secondary connection.

However, this token can also be encapsulated in another signaling message (for example a message compliant with the signaling protocol SIP).

Then, in a step 403, the SFC apparatus 450:
sends the MFC apparatus 410 a resource reservation request compliant with a resource reservation protocol for the exchange of the flow c0; and
transmits the token to the MFC apparatus 410.

To this end, preferably, the token is included in at least one field of the resource reservation request.

However, the token can also be encapsulated in another resource reservation message (for example a message compliant with the resource reservation protocol).

Furthermore, to perform this transmission of the token and/or the sending of the resource reservation request, the SFC apparatus 450 uses a direct interface between the SFC apparatus 450 and the MFC apparatus 410.

However, it can also use any other network function existing in the SFC apparatus or even in another apparatus 460.

Then, in a step 405, a requesting terminal initiates the HNT procedure between the given terminal and the MFC apparatus 410 in order to traverse the NAT apparatus 430 (not shown in FIG. 5). To this end, the requesting terminal sends a first media data packet, here below called a dedicated packet (for example a packet compliant with the RTP protocol) to the MFC apparatus 410. Before transmitting the dedicated packet, the requesting terminal has preliminarily included a first token in a field of this dedicated packet.

Upon reception of the dedicated packet, the MFC apparatus 410 verifies that the requesting terminal, which wishes to use the HNT mechanism with the multimedia flow control apparatus 410 for the transmission of the flow c0, is truly the given terminal which was involved in the execution of the steps referenced 401, 402 with the SFC apparatus 450.

To this end, for example, it makes a check to see if the first token contained in the dedicated packet (and therefore transmitted by the requesting terminal) is identical to the token that it had preliminarily received from the SFC apparatus 450 (in the step 403) here below called a second token. To make a check of this kind, it can combine the first and second tokens by any classic technique.

According to a particular embodiment, if the first and second tokens are identical, then it means that the requesting terminal is the given terminal 420 and then the MFC apparatus 410 updates its NAT table (which is a list of IP/Port addresses) with the IP/Port addresses of the given terminal 420 and authorizes the implementation of the flow corresponding to the flow c0 between the destination apparatus and the given terminal 420.

If the first and second tokens are distinct, then it means that the requesting terminal is not the given terminal (for example the requesting terminal is an identity-thief terminal which tries to access the flow c0 illegally) and then the MFC apparatus 410 does not authorize the implementation of the flow corresponding to the flow c0 between the destination apparatus and the identity-thief terminal. Furthermore, the MFC apparatus 410 informs the SFC apparatus 450 that there is an attempt by an identity-thief terminal to carry out a usurpation.

Should the SFC apparatus 450 be thus informed of an attempt at identity theft, it may for example reject the request by the identity-thief terminal or even carry out any other processing operation such as, for example, registering the identity-thief terminal in a black list of banned devices.

According to one variant of this particular embodiment, the SFC apparatus 450 (at the end of the step 401) generates two distinct tokens, a token A and a token B, which it respectively transmits to the given terminal (for example in the step 402) and to the MFC apparatus (in the step 403). The two tokens A and B are matched, for example because they have a similar structure or are deductible from one another by mathematical transformation or translation of a string of characters.

Thus, according to this variant, upon reception of the dedicated packet, the MFC apparatus 410 makes a check to see if the first token (corresponding to the token A) and the second token (corresponding to the token B) are matched by combining these first and second tokens so as to authorize the exchange of the flow c0 only after checking that the first and second tokens are matched.

In this variant, if the dedicated packet comes from an identity-thief terminal, then the first token (which does not correspond to the token A) and the second token (corresponding to the token B) are not matched and the MFC apparatus 410 does not authorize the implementation of the flow corresponding to the flow c0 between the destination apparatus and the identity-thief terminal.

Figure 6:
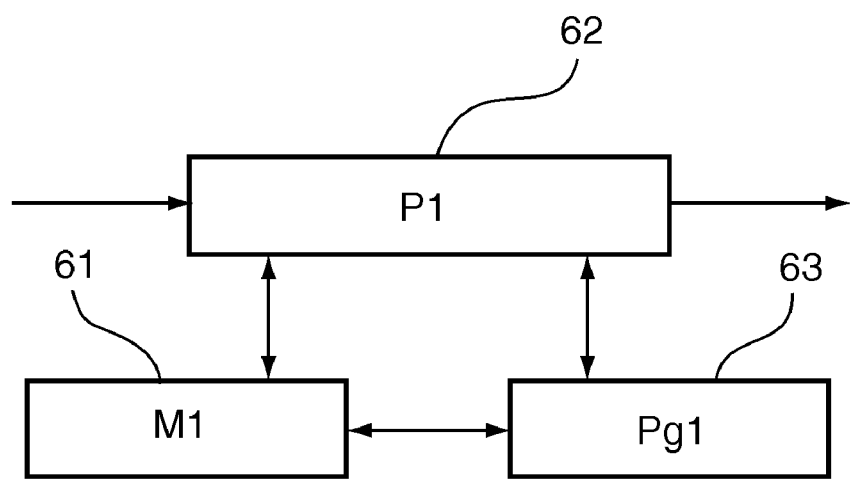
FIG. 6 illustrates the simplified structure of an SFC apparatus according to the particular embodiment of the invention.

Referring now to FIG. 6, we present a simplified structure of an SFC apparatus according to the particular embodiment described here above.

As illustrated in FIG. 6, an SFC apparatus of this kind has a memory 61, a processing unit 62 equipped for example with a microprocessor μP1 and driven by the computer program 63 implementing the transmission method of an embodiment of the invention.

At initialization, the code instructions of the computer program 63 are for example loaded into a RAM before being executed by the processor of the processing unit 62.

The microprocessor of the processing unit 62 implements the steps of the method of transmitting described here above so as to transmit at least one multimedia flow.

To this end, the SFC apparatus has means for setting up signaling with the terminal in the context of a transmission of a multimedia flow from or to the terminal.

It also has:
 means for transmitting a first piece of information of authorization to the terminal;
 means for transmitting a second piece of information of authorization to a data flow control apparatus
the first piece of authorization information being designed to be combined with the second piece of authorization information so as to authorize said transmission of the multimedia flow only after checking that the first and second pieces of information are matched.

These means are driven by the microprocessor of the processing unit 62.

Figure 7:
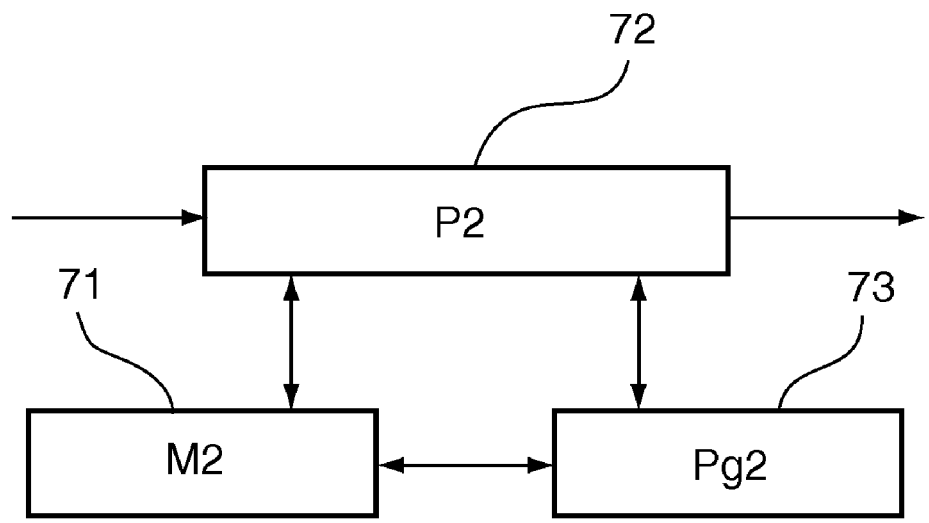
FIG. 7 illustrates the simplified structure of an MFC apparatus according to the particular embodiment of the invention.

Referring now to FIG. 7, we present the simplified structure of an MFC apparatus according to the particular embodiment described here above.

As illustrated in FIG. 7, an MFC apparatus of this kind has a memory 71, a processing unit 72 equipped for example with a microprocessor μP2 and driven by the computer program 73 implementing the transmission method of an embodiment of the invention.

At initialization, the code instructions of the computer program 73 are for example loaded into a RAM before being executed by the processor of the processing unit 72.

The microprocessor of the processing unit 72 implements the steps of the method for transmitting described here above so as to transmit at least one multimedia flow.

To this end, the MFC apparatus comprises means of implementation with a terminal of an (HNT) mechanism for traversing an address translation apparatus (NAT) in the context of the transmission of a given multimedia flow from or to the terminal.

It furthermore comprises means for checking that said requesting terminal requesting the activation of said means for implementing is the same as a second terminal involved in the activation of the means for setting up signaling between the second terminal and a signaling flow control apparatus (SFC apparatus).

These means are driven by the microprocessor of the processing unit 72.

Figure 8:
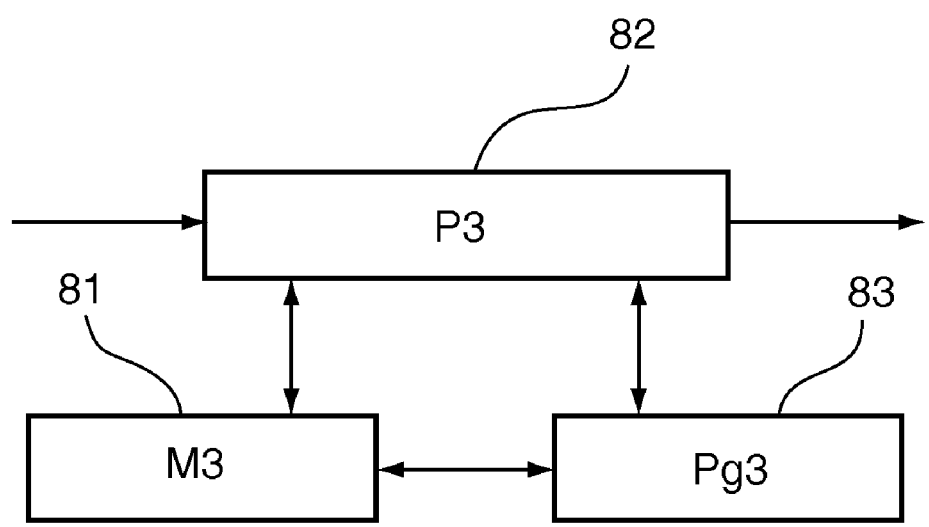
FIG. 8 illustrates the simplified structure of a given terminal according to the particular embodiment of the invention.

Referring now to FIG. 8, we present the simplified structure of a terminal according to the particular embodiment described here above.

As illustrated in FIG. 8, an MFC apparatus of this kind has a memory 81, a processing unit 82 equipped for example with a microprocessor μP3 and driven by the computer program 83 implementing the transmission method of an embodiment of the invention.

At initialization, the code instructions of the computer program 83 are for example loaded into a RAM before being executed by the processor of the processing unit 82.

The microprocessor of the processing unit 82 implements the steps of the method of transmitting described here above so as to transmit at least one multimedia flow.

The microprocessor of the processing unit 72 implements the steps of the transmission method described here above so as to transmit at least one multimedia flow.

To this end, the terminal comprises:
 means for setting up signaling with a signaling flow control SFC) apparatus in the context of a transmission of a multimedia flow from or to the terminal,
 means to implement an (HNT) mechanism of traversal of a NAT address translation apparatus between the terminal and a multimedia flow control apparatus.

It furthermore comprises means for receiving a first piece of authorization information is designed to be combined with a second piece of authorization information so as to authorize said transmission of the multimedia flow only after checking that the first and second pieces of information are matched.

These means are driven by the microprocessor of the processing unit 82.

Although the present disclosure has been described with reference to one or more examples, workers skilled in the art will recognize that changes may be made in form and detail without departing from the scope of the disclosure and/or the appended claims.

The invention claimed is:

1. A method for transmitting a multimedia flow from or to a terminal comprising:
 a step of setting up signaling between the terminal and a signaling flow control apparatus;
 a step of implementing, between a requesting terminal and a multimedia flow control apparatus, a mechanism for traversal of a network translation apparatus; and
 a step of checking that said requesting terminal, requesting execution of said step of implementing, is the same as said terminal involved in execution of said step of setting up signaling, wherein said step of checking is implemented by the multimedia flow control apparatus and comprises a step of combining a first piece of authorization information coming from the requesting terminal and a second piece of authorization information coming from the signaling flow control apparatus and a step of authorizing transmission of the multimedia flow after checking that the first and second pieces of information are matched.

2. The method for transmitting according to claim 1, wherein the first piece and the second piece of authorization information respectively are preliminarily transmitted to the terminal and to the multimedia flow control apparatus respectively by the signaling flow control apparatus.

3. The method for transmitting according to claim 2, wherein the second piece of authorization information is included in at least one field of a request for reserving resources for the transmission of the flow.

4. The method for transmitting according to claim 2, wherein the first piece of authorization information is included in at least one field of a message confirming acceptance of setting up a connection between the signaling flow control apparatus and the requesting terminal.

5. The method for transmitting according to claim 1, wherein the first and second pieces of authorization information are unique for each flow transmitted from or to the terminal.

6. A computer program product recorded on a computer-readable carrier and executable by a processor, wherein the product comprises program code instructions for implementing a method for transmitting a multimedia flow from or to a terminal comprising:
   - a step of setting up signaling between the terminal and a signaling flow control apparatus;
   - a step of implementing, between a requesting terminal and a multimedia flow control apparatus, a mechanism for traversal of a network translation apparatus; and
   - a step of checking that said requesting terminal, requesting execution of said step of implementing, is the same as said terminal involved in execution of said step of setting up signaling, wherein said step of checking is implemented by the multimedia flow control apparatus and comprises a step of combining a first piece of authorization information coming from the requesting terminal and a second piece of authorization information coming from the signaling flow control apparatus and a step of authorizing transmission of the multimedia flow after checking that the first and second pieces of information are matched.

7. A multimedia flow control apparatus comprising:
means for implementing, with a requesting terminal, an HNT mechanism for traversal of a network translation apparatus in a context of a transmission of a multimedia flow from or to the requesting terminal; and
means for checking that said requesting terminal, requesting activation of said means for implementing, is the same as a second terminal involved in activation of means for setting up signaling between the second terminal and a signaling flow control apparatus, wherein said step of checking comprises a step of combining a first piece of authorization information coming from the requesting terminal and a second piece of authorization information coming from the signaling flow control apparatus and a step of authorizing transmission of the multimedia flow after checking that the first and second pieces of information are matched.

8. A signaling flow control apparatus comprising:
means for setting up signaling with a terminal in a context of a transmission of a multimedia flow from or to the terminal;
means for transmitting a first piece of authorization information to the terminal; and
means for transmitting a second piece of authorization information to a multimedia flow control apparatus, wherein the first piece of authorization information is designed to be combined with the second piece of authorization information so as to authorize said transmission of the multimedia flow only after checking that the first and second pieces of information are matched.

* * * * *